(12) United States Patent
Jia et al.

(10) Patent No.: US 10,126,610 B2
(45) Date of Patent: Nov. 13, 2018

(54) ARRAY SUBSTRATE, MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Pijian Jia, Beijing (CN); Zhaohui Hao, Beijing (CN); Lin Li, Beijing (CN); Lingqi Meng, Beijing (CN); Huzhao Shi, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/819,547

(22) Filed: Nov. 21, 2017

(65) Prior Publication Data
US 2018/0210296 A1 Jul. 26, 2018

(30) Foreign Application Priority Data
Jan. 20, 2017 (CN) .......................... 2017 1 0042420

(51) Int. Cl.
| | | |
|---|---|---|
| H01L 23/48 | (2006.01) | |
| H01L 23/52 | (2006.01) | |
| H01L 29/40 | (2006.01) | |
| G02F 1/1343 | (2006.01) | |
| G02F 1/1362 | (2006.01) | |
| G02F 1/1368 | (2006.01) | |

(52) U.S. Cl.
CPC .... *G02F 1/134363* (2013.01); *G02F 1/13439* (2013.01); *G02F 1/134336* (2013.01); *G02F 1/136286* (2013.01); *G02F 1/1368* (2013.01); *G02F 2001/134318* (2013.01); *G02F 2001/136295* (2013.01); *G02F 2201/121* (2013.01); *G02F 2201/123* (2013.01)

(58) Field of Classification Search
CPC ......... G02F 1/134363; G02F 1/134336; G02F 1/13439; G02F 1/136286; G02F 1/1368; G02F 2001/134318; G02F 2001/136295; G02F 2001/121; G02F 2001/123
See application file for complete search history.

(56) References Cited

U.S. PATENT DOCUMENTS

2016/0357314 A1* 12/2016 Liu ................... G02F 1/136227

* cited by examiner

*Primary Examiner* — Calvin Choi
(74) *Attorney, Agent, or Firm* — Foley & Lardner LLP; James F. Ewing; Meng P. Pua

(57) ABSTRACT

The present disclosure provides an array substrate, manufacturing method thereof and a display device. A method of manufacturing an array substrate includes: sequentially forming a common electrode line, a first insulating layer, a pixel electrode, and a second insulating layer, and forming a via that is in communication with the common electrode line. The method further comprises, after forming the via, forming a common electrode that covers the via through a patterning process, wherein the patterning process includes etching a portion of the via covered with the common electrode to form an isolated region. The isolated region includes a region at an inner side of a first edge of the via. The first edge is an edge of the via adjacent to or stacked with the pixel electrode. The via further includes a second edge that is neither adjacent to nor stacked with the pixel electrode.

14 Claims, 5 Drawing Sheets

ARRAY SUBSTRATE, MANUFACTURING METHOD THEREOF AND DISPLAY DEVICE

CROSS-REFERENCE TO RELATED APPLICATIONS

This application claims priority to and the benefit of Chinese Patent Application No. 201710042420.X, filed on Jan. 20, 2017, which is incorporated herein by reference in its entirety and used for all purposes.

TECHNICAL FIELD

The present disclosure relates generally to the technical field of an array substrate, and in particular to an array substrate manufacturing method thereof and a display device.

BACKGROUND

For liquid crystal display devices in a HADS mode, pixel electrodes and common electrodes are both provided in an array substrate. However, the conventional array substrates are liable to result in display abnormalities due to an offset of a pixel electrode.

SUMMARY

Some embodiments of the present disclosure are directed to a method of manufacturing an array substrate, comprising: sequentially forming a common electrode line, a first insulating layer, a pixel electrode, and a second insulating layer, forming a via in communication with the common electrode line; and after forming the via, forming a common electrode that covers the via by a patterning process. The patterning process includes etching a portion of the via covered with the common electrode to form an isolated region. The isolated region includes a region at an inner side of a first edge of the via. The first edge being an edge of the via adjacent to or stacked with the pixel electrode. The via further includes a second edge that is neither adjacent to nor stacked with the pixel electrode.

In some embodiments, the pixel electrode is provided at a portion of the via.

In some embodiments, the isolated region is a strip-shaped region distributed along the inner side of the first edge of the via.

In some embodiments, the common electrode line includes a strip-shaped body and a projection provided on one side of the body, and the via is in communication with the projection.

In further embodiments, the via covers the projection.

In further embodiments, an edge of the projection away from one side of the body is adjacent to or stacked with the pixel electrode; and the first edge of the via corresponds to the edge of the projection away from the one side of the body.

Another embodiment of the present disclosure is directed to an array substrate, comprising a base, and a common electrode line, a first insulating layer, a pixel electrode, a second insulating layer, and a common electrode provided sequentially in a direction away from the base. The array substrate further comprises a via in communication with the common electrode line and covered with the common electrode. A first edge of the via is adjacent to or stacked with the pixel electrode, and the via further includes a second edge that is neither adjacent to nor stacked with the pixel electrode. The common electrode is provided with an opening in an isolated region, and the isolated region includes a region at an inner side of the first edge of the via.

In some embodiments, a portion of the pixel electrode is located within the via, the pixel electrode is provided with a trench at a position corresponding to the isolated region, and the portion of the pixel electrode within the via is separated from a portion of the pixel electrode outside the via by the trench.

In some embodiments, the isolated region is a strip-shaped region distributed along the inner side of the first edge of the via.

In some embodiments, the common electrode line includes a strip-shaped body and a projection provided on one side of the body, the via being in communication with the projection.

A further embodiment of the present disclosure is directed to a display device, which comprises any of the array substrates described above.

DETAILED DESCRIPTION

In order to provide those skilled in the art a better understanding of the technical solutions of the present disclosure, a detailed description of some embodiments of the present disclosure is further provided below with reference to the accompanying drawings and detailed implementations.

Figure 1:
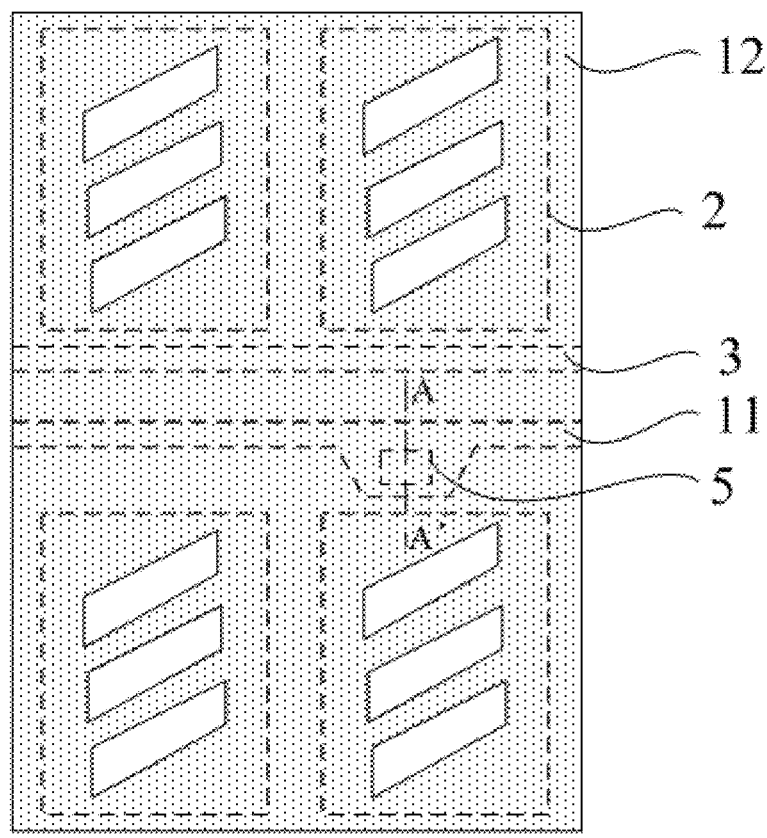
FIG. 1 is a top structural view of a conventional array substrate.
Figure 2:
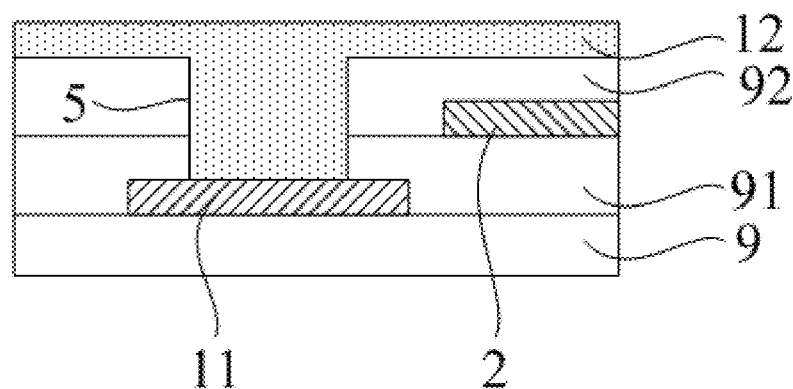
FIG. 2 is a cross-sectional structural view along AA' in FIG. 1.

For liquid crystal display devices in a HADS mode, a pixel electrode 2 and a common electrode 12 are both provided in an array substrate. As shown in FIG. 1 and FIG. 2, a common electrode line 11 and a gate line 3 are provided in the same layer, and located on a base 9 of the array substrate, which is covered with a gate insulating layer 91 (a first insulating layer); a plate-like pixel electrode 2 is provided over the gate insulating layer 91, covered with a passivation layer 92 (a second insulating layer); a slit common electrode 12 is provided over the passivation layer 92, and needs to be connected to the common electrode line 11 via a via 5 through the gate insulating layer 91 and the passivation layer 92 to obtain signals. To prevent the common electrode 12 from conducting with the pixel electrode 2, the via 5 is provided between adjacent pixel electrodes 2.

Figure 3:
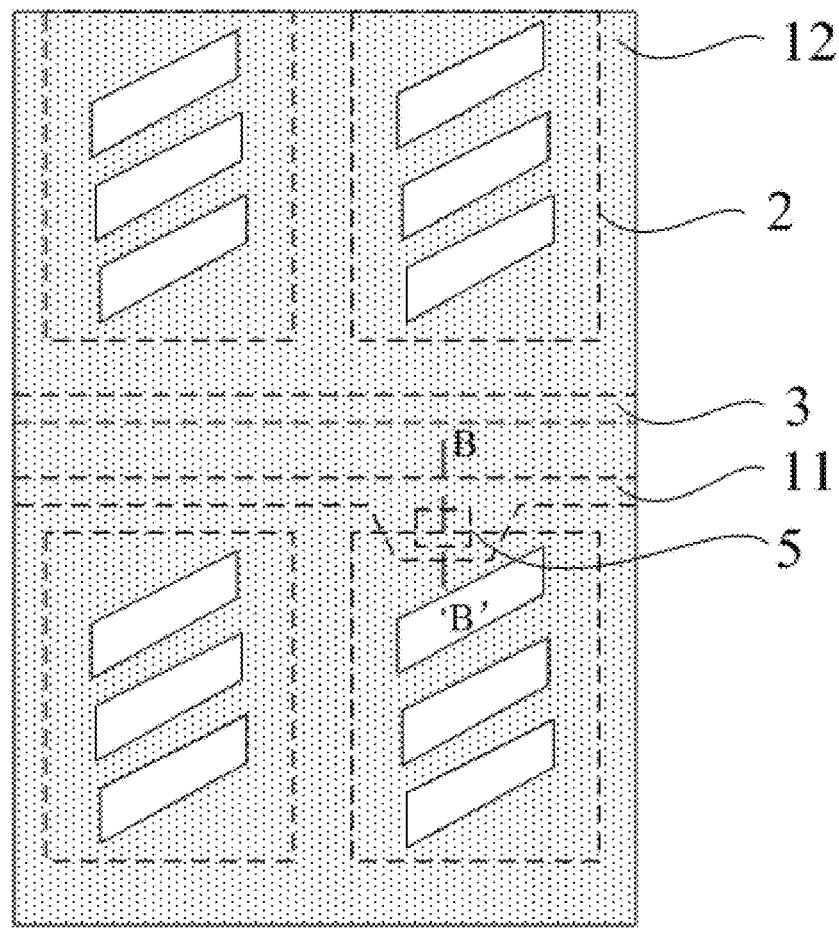
FIG. 3 is a top structural view of a conventional array substrate when an offset of a pixel electrode occurs.
Figure 4:
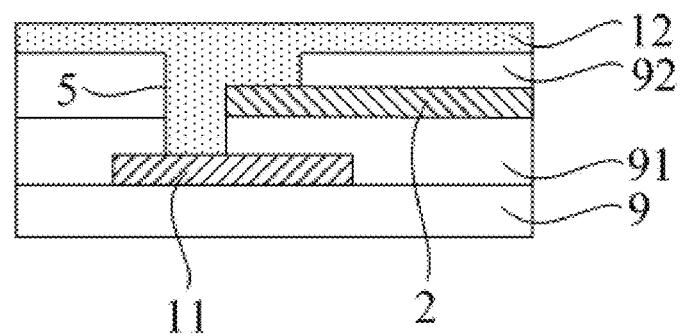
FIG. 4 is a cross-sectional structural view along BB' in FIG. 3.

With the improvement of resolution, a distance between the adjacent pixel electrodes 2 is getting smaller, and a distance between the via 5 and the pixel electrode 2 adjacent thereto is also getting smaller (e.g., only 3 μm). However, in the practical manufacturing process, the location of the pixel electrode 2 may have some deviations, and as shown in FIG. 3 and FIG. 4, if the pixel electrode 2 is offset and partially overlaps the via 5, the pixel electrode 2 will be caused to be exposed at the via 5, and the gate insulating layer 91 beneath the pixel electrode 2 cannot be removed; moreover, when the common electrode 12 is subsequently formed, the common electrode 12 will come into contact and conduct with the pixel electrode 2 within the via 5. As a consequence, the pixel electrode 2 connects to a common voltage, and the display of the corresponding pixel is abnormal.

At least one embodiment of the present disclosure at least partially solves a problem that the conventional array substrates are liable to result in display abnormalities due to an offset of a pixel electrode, and provides an array substrate, manufacturing method thereof, and a display device that are capable of avoiding display abnormalities.

In a method of manufacturing an array substrate according to at least one embodiment of the present disclosure, when the common electrode is formed, etching is to be performed at the inner side of the first edge of the via adjacent to the pixel electrode so as to form an opening. When the via overlaps the pixel electrode, there will be the pixel electrode at the inner side of the first edge of the via. Since the pixel electrode is made of the same material as the common electrode, the pixel electrode at the opening will also be removed at the time of etching the common electrode, so that a portion of the pixel electrode connected to the common electrode is cut off from other portions of the pixel electrode, thereby preventing the pixel electrode that actually performs a display function from conducting with the common electrode, and eliminating display abnormalities. In the present disclosure, that two structures are "provided in the same layer" means that both of them are formed by subjecting the same material layer to a patterning process, so they are located in the same layer in terms of a lamination relationship, which however does not necessarily mean that both of them must have an equal distance from the base.

In the present disclosure, a "photolithography process", which is a specific form of a patterning process, is a process of forming a specific pattern structure using a complete material layer, which specifically includes one or more forming a material layer, applying a photoresist, exposing, developing, etching, stripping the photoresist, and so on.

As shown in FIG. 5 to FIG. 10, some embodiments of the present disclosure provide a method of manufacturing an array substrate, comprising: sequentially forming a common electrode line 11, a first insulating layer (a gate insulating layer 91), a pixel electrode 2, and a second insulating layer (a passivation layer 92), forming a via 5 which is in communication with the common electrode line 11; and after forming the via 5, forming a common electrode 12 that covers the via 5 by a patterning process, the patterning process including etching a portion of the via 5 covered with the common electrode 12 to form an isolated region 4. The isolated region 4 includes a region at an inner side of a first edge of the via 5, the first edge being an edge of the via 5 adjacent to or stacked with the pixel electrode 2, and the via 5 further includes a second edge that is neither adjacent to nor stacked with the pixel electrode 2.

Herein, one side of the via 5 is adjacent to the pixel electrode 2, so an edge at this side of the via 5 (the first edge) may be adjacent to the pixel electrode 2. When the pixel electrode 2 is offset, or when the pixel electrode 2 is deliberately designed to partially overlap the via 5, the first edge will overlap the pixel electrode 2, and therefore there will be the pixel electrode 2 in a portion of the region at the inner side of the first edge of the via 5. Meanwhile, between the other side of the via 5 and the pixel electrode 2 is provided a gate line 3 and the like, so an edge at this side of the via 5 (the second edge) will not be adjacent to a pixel electrode 2. Moreover, even if the pixel electrode 2 is offset, the second edge will not overlap the pixel electrode 2 (because the pixel electrode 2 will not be offset too much). That is, there will not be the pixel electrode 2 in a portion of the region at an inner side of the second edge of the via 5.

In a method of manufacturing the array substrate according to some embodiments of the present disclosure, when the common electrode 12 is formed (for example, a slit in the common electrode 12 is etched), it is required to also perform etching at the inner side (the isolated region 4) of the first edge of the via 5 adjacent to the pixel electrode 2 to form an opening 121. When there is an overlap of the via 5 with the pixel electrode 2, there will be the pixel electrode 2 at the inner side (the isolated region 4) of the first edge of the via 5. Since the pixel electrode 2 is made of the same material as the common electrode 12, when the common electrode 12 is etched to form the opening 121, the pixel electrode 2 at the opening 121 (the isolated region 4) will also be removed, so that a portion of the pixel electrode 2 connected to the common electrode 12 is cut off from other portions of the pixel electrode 2. Therefore, the pixel electrode 2 that actually performs a display function will not connect to the common electrode 12, which can avoid display abnormalities. Meanwhile, since the via 5 further has the second edge that is not adjacent to the pixel electrode 2, there will be no pixel electrode 2 at the inner side of the second edge thereof. Therefore, the common electrode 12 can still connect to the common electrode line 11 at the inner side of the second edge, thereby ensuring normal transmission of common electrode signals.

The method of manufacturing an array substrate according to some embodiments of the present disclosure will be described in detail in the following.

A pattern that includes a common electrode line 11 on a base 9 is formed through a photolithography process.

That is, the common electrode line 11 is formed from materials such as metal or the like, on the base 9 of glass or the like.

In some embodiments, a gate electrode (not shown) and a gate line 3 can also be formed at the same time of forming the common electrode line 11, that is, the common electrode line 11 can be provided in the same layer as the gate line 3.

In some embodiments, the common electrode line 11 includes a strip-shaped body and a projection provided on one side of the body, and a via 5 formed subsequently is in communication with the projection.

Figure 5:
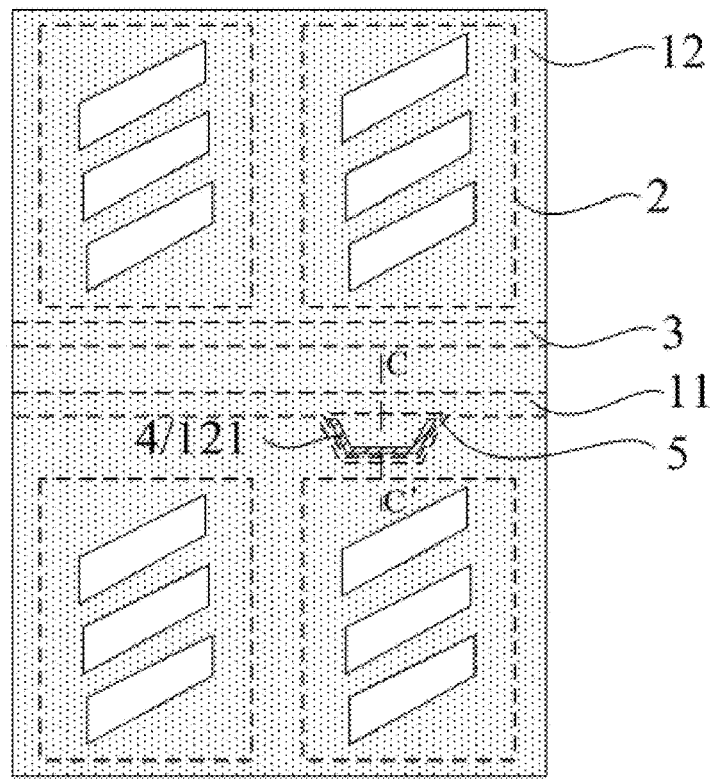
FIG. 5 is a top structural view of an array substrate according to at least one embodiment of the present disclosure.

As shown in FIG. 5, generally, in order to enlarge a connection area of the via 5 and the common electrode line 11, a projection (e.g. a trapezoid projection) can be provided in the common electrode line 11, and the via 5 can connect to that projection.

In some embodiments, prior to forming the common electrode line 11, the method may further comprise forming a buffer layer (not shown) or the like, which is not detailed herein.

A first insulating layer (i.e., a gate insulating layer 91, which is taken as an example hereinafter) is formed on the base 9 upon which the foregoing steps are completed.

That is, the gate insulating layer 91, which covers the common electrode line 11, the gate line 3, and the gate electrode, is formed from materials such as silicon oxide and silicon nitride, etc.

A pattern that includes an active region is formed on the base 9 upon which the foregoing steps are completed through a photolithography process.

That is, an active region of a thin-film transistor (not shown) is formed from semiconductor material.

A pattern that includes a data line, a source electrode, and a drain electrode is formed on the base 9 upon which the foregoing steps are completed through the photolithography process.

That is, the data line, the source electrode, and the drain electrode (not shown) are formed from a metal or the like, thereby constituting a thin-film transistor, wherein the data line is connected to the source electrode, and the source and drain electrodes are both connected to the active region.

A pattern that includes the pixel electrode 2 is formed on the base 9 upon which the foregoing steps are completed through a photolithography process.

That is, the pixel electrode 2 is formed from a transparent conductive material such as indium tin oxide (ITO). The pixel electrode 2 is block-like, and a pixel electrode 2 of each pixel is connected to a drain electrode of a thin-film transistor of the corresponding pixel, and pixel electrodes 2 of different pixels are provided at an interval.

A second insulating layer (i.e., a passivation layer 92, which is taken as an example hereinafter) is formed on the base 9 upon which the foregoing steps are completed through a photolithography process.

That is, the passivation layer 92, which covers the pixel electrode 2, the data line, the source electrode, the drain electrode, and the active region, is formed from material such as silicon oxide and silicon nitride, etc.

The via 5 that is in communication with the common electrode line 11 is formed on the base 9 upon which the foregoing steps are completed, wherein the via 5 has a first edge that is adjacent to or stacked with the pixel electrode 2, and a second edge that is neither adjacent to nor stacked with the pixel electrode 2.

That is, the gate insulating layer 91 and the passivation layer 92 above a particular position (e.g., the projection) of the common electrode line 11 are etched, thereby forming the via 5 that goes through the gate insulating layer 91 and the passivation layer 92 and is in communication with the common electrode line 11, for realizing connection of a common electrode 12 to the common electrode line 11.

In some embodiments, the pixel electrode 2 is provided at a portion of the via 5.

Figure 7:
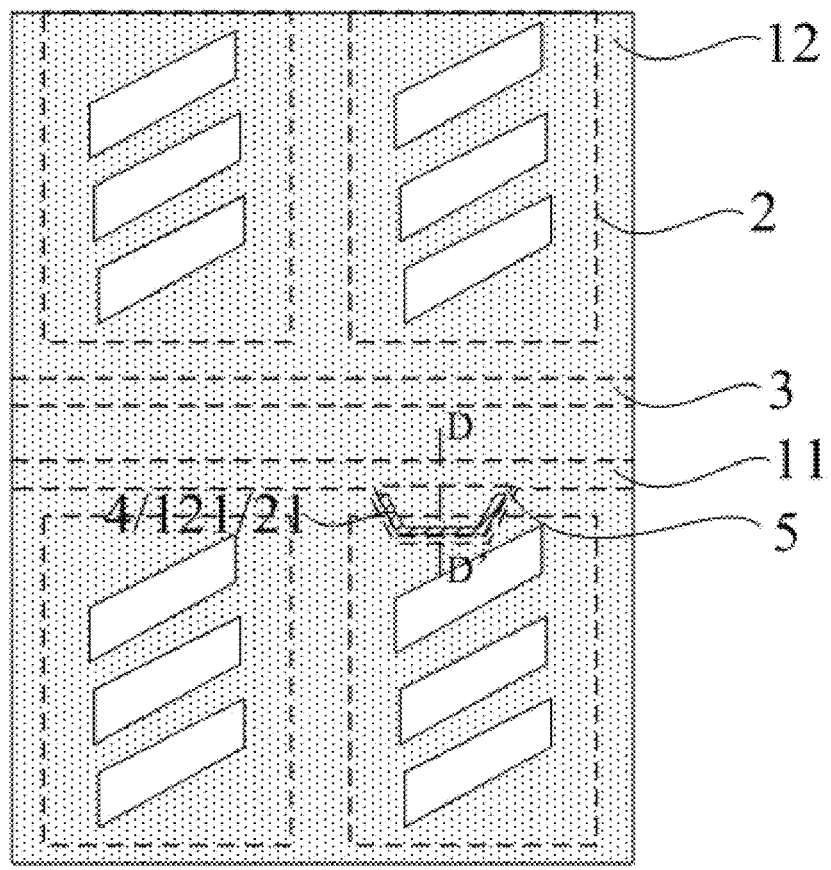
FIG. 7 is a top structural view of an array substrate according to at least one embodiment of the present disclosure when an offset of a pixel electrode occurs.
Figure 8:
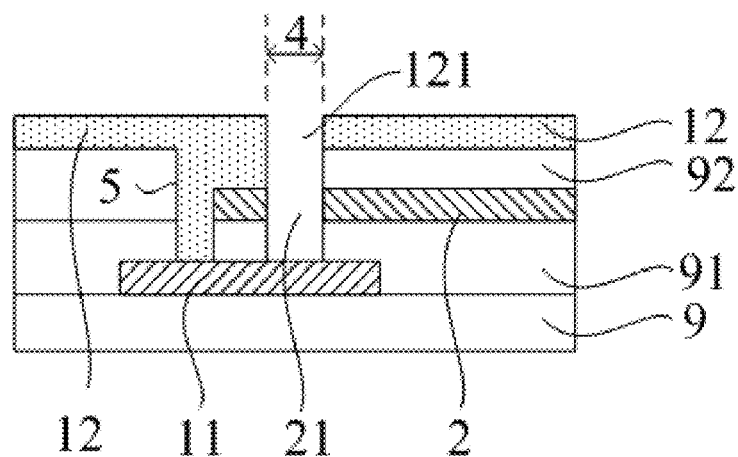
FIG. 8 is a cross-sectional structural view along DD' in FIG. 7.

In other words, as shown in FIG. 7 and FIG. 8, when the pixel electrode 2 is offset, the via 5 will come into connection with the pixel electrode 2. That is, there will be a pixel electrode 2 at a portion of the via 5. Of course, since only the first edge of the via 5 is adjacent to the pixel electrode 2 while the second edge is not adjacent to the pixel electrode 2, even if the pixel electrode 2 is offset, it will be offset at most to the inner side of the first edge and will not fill the whole via 5.

Alternatively, the pixel electrode 2 may be designed to extend to the inner side of the first edge of the via 5, that is, an edge portion of the pixel electrode 2 is made deliberately to enter the via 5 (the effect produced thereby is the same as the effect from an offset). Of course, in this case, it should be ensured that the pixel electrode 2 does not fill the whole via 5.

In some embodiments, the via 5 is connected to a projection of the common electrode line 11. In other embodiments, the via 5 covers the projection. In further embodiments, an edge of the projection away from one side of the body is adjacent to or stacked with the pixel electrode 2; the first edge of the via 5 corresponds to the edge of the projection away from the one side of the body.

In other words, as shown in FIG. 5 and FIG. 7, in some embodiments, the via 5 is connected to the projection described above. Moreover, due to a method according to some embodiments of the present disclosure, even if the pixel electrode 2 is offset, display abnormalities can be avoided. Therefore, the via 5 can be larger to completely cover the projection. In other embodiments, the one side of the projection away from the body of the common electrode line 11 overlap the first edge of the via 5, that is, the via 5 has the same shape as the projection.

A common electrode 12 is formed through a patterning process (which may specifically be a photolithography process) on the base 9 upon which the foregoing steps are completed. The patterning process includes etching a portion of the via 5 covered with the common electrode 12 to form the isolated region 4; wherein the isolated region 4 includes a region at the inner side of the first edge of the via 5.

That is, a transparent conductive material (such as indium tin oxide, etc.) layer is formed first; then the steps of applying a photoresist and performing exposure and development are carried out, such that the photoresist at a slit of the common electrode 12 is removed so as to expose the transparent conductive material layer at the corresponding position; after that, etching is performed to remove the exposed transparent conductive material layer, thereby forming the common electrode 12 having the slit; finally, the photoresist is stripped.

Figure 6:
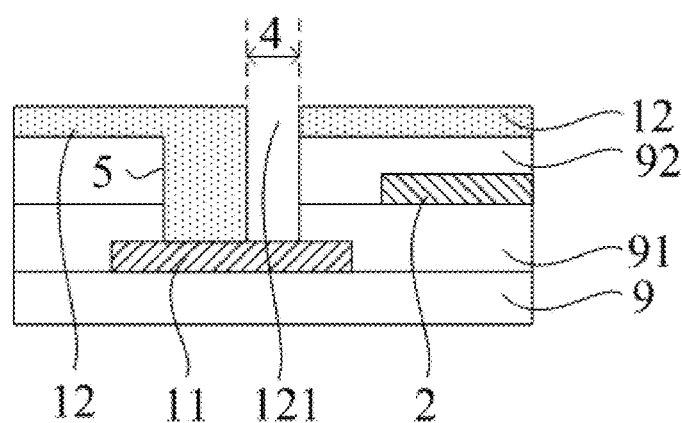
FIG. 6 is a cross-sectional structural view along CC' in FIG. 5.

Different from conventional steps of forming the common electrode 12, in the steps of performing exposure and development described above, the photoresist corresponding to the position of the isolated region 4 is also removed. As such, as shown in FIG. 5 and FIG. 6, in the process of etching, the transparent conductive material layer in the isolated region 4 will also be etched, thereby removing the common electrode 12 at this position to form an opening 121. As shown in FIG. 7 and FIG. 8, if the pixel electrode 2 is offset or is deliberately designed to partially overlap the via 5, the region at the inner side of the first edge of the via 5 will be provided with the pixel electrode 2, and the pixel electrode 2 at this position is connected the common electrode 12 upward. Thus, at the time of forming the opening 121 in the common electrode 12, the pixel electrode 2 therebeneath is also removed, thereby forming a "trench 21" distributed in the pixel electrode 2 along the first edge.

Figure 9:
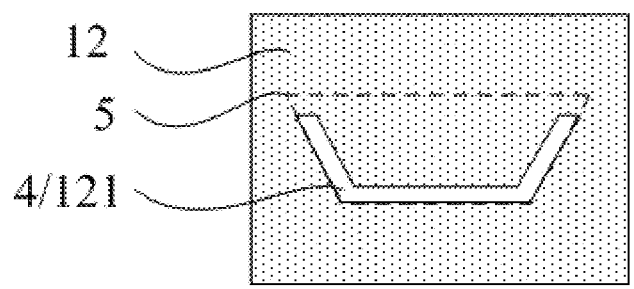
FIG. 9 is a local structural view of a common electrode near a via in FIG. 7.

As shown in FIG. 8 and FIG. 9, the common electrode 12 covers the via. Hence, although the opening 121 is formed therein, a portion of the common electrode 12 that is connected to the common electrode line 11 (i.e., the portion of the common electrode 12 that is located at the inner side of the second edge of the via 5) is still integrally connected to other portions of the common electrode 12, such that signals of the common electrode line 11 can still be transferred to the entire common electrode 12.

Figure 10:
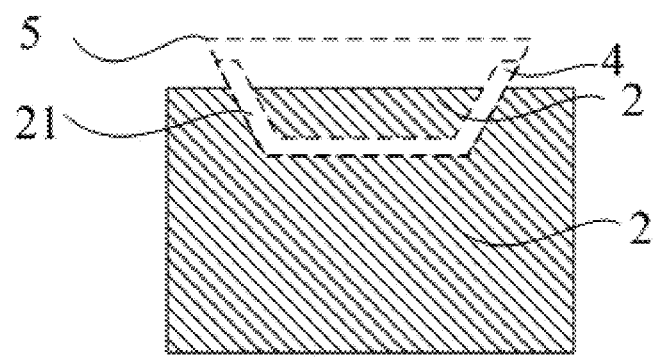
FIG. 10 is a local structural view of a pixel electrode near the via in FIG. 7.

Still, as shown in FIG. 8 and FIG. 10, the pixel electrode 2 only overlaps the first edge without extending to the second edge. Hence, the "trench 21" described above can "split" the pixel electrode 2 into two non-interconnected separate portions, wherein one portion is located within the via 5 and connected to the common electrode 12, while the other is located outside the via 5 and not connected to the common electrode 12. Since the pixel electrode 2 that is actually used for generating a drive voltage is the portion outside the via, the trench 21 described above can prevent signals of the common electrode 12 from being transferred to the pixel electrode 2 that actually performs a display function, such that display abnormalities can be avoided.

In other embodiments, the isolated region 4 is a strip-shaped region distributed along the inner side of the via 5.

That is, in the other embodiments, the isolated region 4 is an elongated region provided at the inner side of the first edge of the via 5, thereby forming the opening 121 and the trench 21 described above. Such an isolated region 4 has a smaller area, which can make a contact area of the common electrode 12 within the via 5 and the common electrode line 11 as large as possible, thereby improving the electrical connection condition.

Of course, the isolated region 4 described above may also be in other forms, as long as it includes the region at the inner side of the first edge of the via 5. For example, the isolated region 4 may be one half region within the via 5 that is adjacent to the first edge. In this case, the pixel electrode 2 in this region may not be isolated by the trench, but will be completely removed. Meanwhile, the common electrode 12 may be connected to the common electrode line 11 through the other half region within the via 5. As such, display abnormalities may also be avoided.

Herein, if an offset of the pixel electrode 2 occurs, or if the pixel electrode 2 is deliberately designed to partially overlap the via 5, the gate insulating layer 91 beneath a position within the via 5 where the pixel electrode 2 is located may not be removed, and this position has a relatively large height. As such, a segment difference between the common electrode 12 and the pixel electrode 2 at this position (when connected) is smaller, which can decrease resistance and avoid the breakage of the common electrode 12 or the like.

Some embodiments of the present disclosure further provide an array substrate manufactured with the aforementioned method, which comprises a base 9, and a common electrode line 11, a first insulating layer (a gate insulating layer 91), a pixel electrode 2, a second insulating layer (a passivation layer 92), and a common electrode 12 that are provided sequentially in a direction away from the base 9, wherein the array substrate further comprises a via 5 in communication with the common electrode line 11 and covered by the common electrode 12.

A first edge of the via 5 is adjacent to or stacked with the pixel electrode 2, and the via 5 further includes a second edge that is neither adjacent to nor stacked with the pixel electrode 2.

The common electrode 12 is provided with an opening 121 in an insolated region 4, and the isolated region 4 includes a region at the inner side of the first edge of the via 5.

The array substrate according to some embodiments of the present disclosure is manufactured with the aforementioned method, in which the common electrode 12 is provided with the opening 121 in the isolated region 4. Thus, even if the pixel electrode 2 is offset, the common electrode 12 in the array substrate product will not conduct with the pixel electrode 2 that actually performs a display function.

In some embodiments, a portion of the pixel electrode 2 is located within the via 5, and the pixel electrode 2 is provided with a trench 21 at a position corresponding to the isolated region 4, and the portion of the pixel electrode 2 within the via 5 is separated from a portion of the pixel electrode 2 outside the via 5 by the trench 21.

That is, if an offset of the pixel electrode 2 occurs, or if the pixel electrode 2 is deliberately designed to partially overlap the via 5, the pixel electrode 2 may be formed with the trench 21 in the isolated region 4. The trench 21 separates the pixel electrode 2 within the via 5 from the pixel electrode outside the via 5, thereby preventing the common electrode 12 from conducting with the pixel electrode 2 that actually performs a display function.

In some embodiments, the isolated region 4 is a strip-shaped region distributed along the inner side of the first edge.

In some embodiments, the common electrode line 11 includes a strip-shaped body and a projection provided on one side of the body, and the via 5 is in communication with the projection.

As is noted above, in some embodiments, the isolated region 4 in the array substrate is a strip-shaped region, and the common electrode line 11 can also be provided with the projection described above for connecting to the via 5.

Some embodiments of the present disclosure provide a display device, comprising an array substrate according to any of the embodiments of the present disclosure, wherein the display device may be any product or means having a display function such as a liquid crystal panel, electronic paper, a mobile phone, a tablet computer, a television, a display, a notebook computer, a digital photo frame, a navigator or the like.

It will be appreciated that, the embodiments described above are exemplary embodiments adopted merely for illustrating the principles of the present disclosure, but the present disclosure is not limited thereto. For those skilled in the art, various variations and modifications can be made without departing from the spirit and essence of the present disclosure, and these variations and modifications are also considered to be within the scope of protection of the present disclosure.

What is claimed is:

1. A method of manufacturing an array substrate, comprising:
   sequentially forming a common electrode line, a first insulating layer, a pixel electrode, and a second insulating layer;
   forming a via that is in communication with the common electrode line; and
   after forming the via, forming, through a patterning process, a common electrode that covers the via, the patterning process including etching a portion of the via covered with the common electrode to form an isolated region;
   wherein the isolated region includes a region at an inner side of a first edge of the via, the first edge being an edge of the via adjacent to or stacked with the pixel electrode, and wherein the via further includes a second edge that is neither adjacent to nor stacked with the pixel electrode.

2. The method of manufacturing an array substrate according to claim 1, wherein the pixel electrode is provided at a portion of the via.

3. The method of manufacturing an array substrate according to claim 1, wherein the isolated region is a strip-shaped region distributed along the inner side of the first edge of the via.

4. The method of manufacturing an array substrate according to claim 1, wherein the common electrode line includes a strip-shaped body and a projection provided on one side of the body, and the via is in communication with the projection.

5. The method of manufacturing an array substrate according to claim 4, wherein the via covers the projection.

6. The method of manufacturing an array substrate according to claim 5, wherein an edge of the projection away from the one side of the body is adjacent to or stacked with the pixel electrode; and
the first edge of the via corresponds to the edge of the projection away from the one side of the body.

7. An array substrate, comprising:
a base, and a common electrode line, a first insulating layer, a pixel electrode, a second insulating layer, and a common electrode provided sequentially in a direction away from the base; and
a via in communication with the common electrode line and covered with the common electrode;
wherein a first edge of the via is adjacent to or stacked with the pixel electrode, and the via further includes a second edge that is neither adjacent to nor stacked with the pixel electrode; and
wherein the common electrode is provided with an opening in an isolated region, the isolated region including a region at an inner side of the first edge of the via.

8. The array substrate according to claim 7, wherein a portion of the pixel electrode is located within the via, the pixel electrode is provided with a trench at a position corresponding to the isolated region, and the portion of the pixel electrode within the via is separated from a portion of the pixel electrode outside the via by the trench.

9. The array substrate according to claim 7, wherein the isolated region is a strip-shaped region distributed along the inner side of the first edge of the via.

10. The array substrate according to claim 7, wherein the common electrode line includes a strip-shaped body and a projection provided on one side of the body, and the via is in communication with the projection.

11. A display device, comprising:
the array substrate according to claim 7.

12. The display device according to claim 11, wherein a portion of the pixel electrode is located within the via, the pixel electrode is provided with a trench at a position corresponding to the isolated region, and the portion of the pixel electrode within the via is separated from a portion of the pixel electrode outside the via by the trench.

13. The display device according to claim 11, wherein the isolated region is a strip-shaped region distributed along the inner side of the first edge of the via.

14. The display device according to claim 11, wherein the common electrode line includes a strip-shaped body and a projection provided on one side of the body, and the via is in communication with the projection.

\* \* \* \* \*